United States Patent
Hsu et al.

(10) Patent No.: US 10,411,311 B2
(45) Date of Patent: Sep. 10, 2019

(54) INTEGRATED PASSIVE COOLING SYSTEM AND METHOD

(71) Applicant: GM Global Technology Operations LLC, Detroit, MI (US)

(72) Inventors: Chih-Cheng Hsu, Bloomfield Township, MI (US); Alexander M. Bilinski, Avoca, MI (US); Pablo Valencia, Jr., Northville, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 248 days.

(21) Appl. No.: 15/408,800

(22) Filed: Jan. 18, 2017

(65) Prior Publication Data
US 2017/0256829 A1    Sep. 7, 2017

Related U.S. Application Data

(60) Provisional application No. 62/301,708, filed on Mar. 1, 2016.

(51) Int. Cl.
| | |
|---|---|
| *H01M 10/613* | (2014.01) |
| *H01M 2/10* | (2006.01) |
| *H01M 10/6551* | (2014.01) |
| *H01M 10/653* | (2014.01) |
| *H01M 10/625* | (2014.01) |
| *H01M 10/643* | (2014.01) |

(Continued)

(52) U.S. Cl.
CPC ............ *H01M 10/613* (2015.04); *B62M 6/90* (2013.01); *H01M 2/1077* (2013.01); *H01M 2/1094* (2013.01); *H01M 2/206* (2013.01); *H01M 10/625* (2015.04); *H01M 10/653* (2015.04); *H01M 10/6551* (2015.04); *H01M 2/1083* (2013.01); *H01M 10/643* (2015.04)

(58) Field of Classification Search
CPC .. H01M 2/1077; H01M 2/1094; H01M 2/206; H01M 2/1083; H01M 10/613; H01M 10/625; H01M 10/653; H01M 10/6551; H01M 10/643
See application file for complete search history.

(56) References Cited

U.S. PATENT DOCUMENTS

| | | | |
|---|---|---|---|
| 2014/0186687 A1* | 7/2014 | Obasih | H01M 2/0262 429/164 |
| 2014/0186693 A1* | 7/2014 | Tyler | H01M 2/0262 429/186 |

(Continued)

FOREIGN PATENT DOCUMENTS

| | | |
|---|---|---|
| CN | 101286575 A | 10/2008 |
| CN | 101325269 A | 12/2008 |

(Continued)

OTHER PUBLICATIONS

State Intellectual Property Office of the Peoples Republic of China, Office Action for Chinese 3atent Application No. 201710116662.9 dated May 14, 2019.

*Primary Examiner* — Jonathan G Jelsma
(74) *Attorney, Agent, or Firm* — Lorenz & Kopf LLP

(57) ABSTRACT

A product may include a battery pack, and a housing may receive the battery pack. The housing may comprise a plastic containing an additive that is electrically insulating and that has a greater thermal conductivity than the plastic.

16 Claims, 2 Drawing Sheets

(51) Int. Cl.
*B62M 6/90* (2010.01)
*H01M 2/20* (2006.01)

(56) References Cited

U.S. PATENT DOCUMENTS

| | | | |
|---|---|---|---|
| 2015/0270590 A1* | 9/2015 | Okutani | H01M 10/613 429/82 |
| 2016/0197384 A1* | 7/2016 | DeKeuster | H01M 2/305 429/120 |
| 2016/0211086 A1* | 7/2016 | Pyzza | H01G 9/0003 |

FOREIGN PATENT DOCUMENTS

| | | |
|---|---|---|
| CN | 101938016 A | 1/2011 |
| CN | 105051933 A | 11/2015 |

* cited by examiner

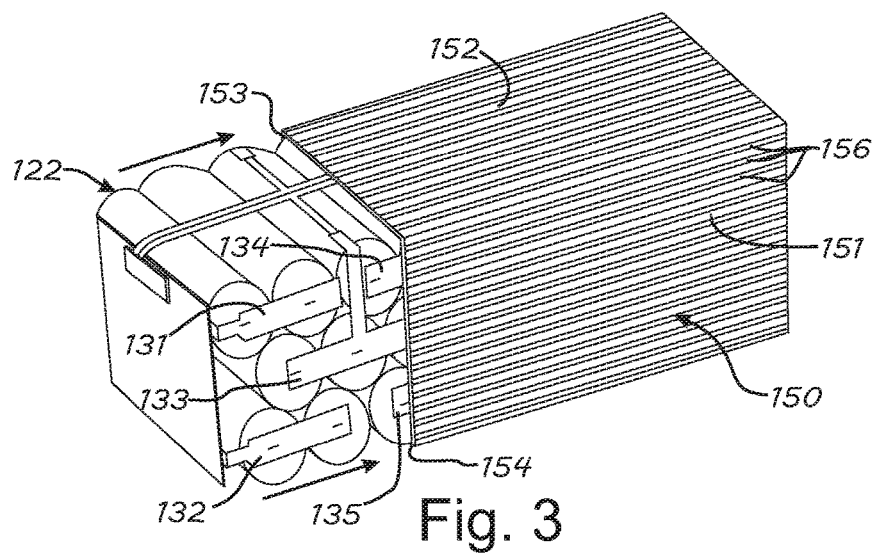
Fig. 3
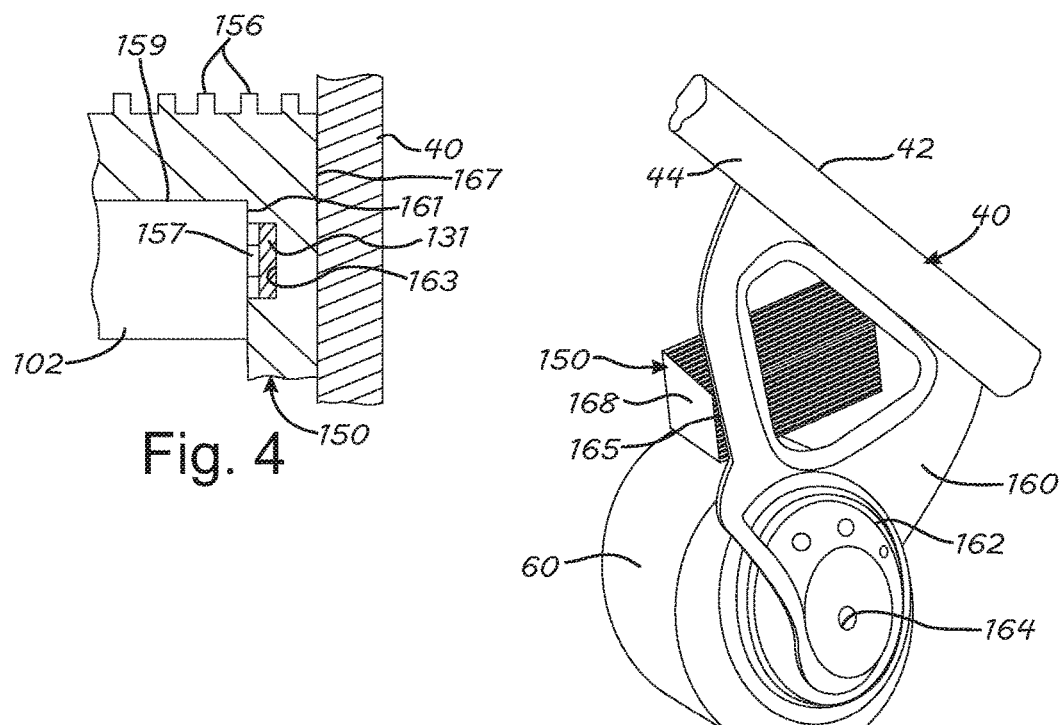
Fig. 4
Fig. 5

INTEGRATED PASSIVE COOLING SYSTEM AND METHOD

CROSS-REFERENCE TO RELATED APPLICATIONS

This application claims the benefit of U.S. Provisional Application No. 62/301,708 filed Mar. 1, 2016.

TECHNICAL FIELD

The field to which the disclosure generally relates includes electric cycles, and more particularly, includes electric cycles with battery powered propulsion systems.

BACKGROUND

An electric cycle may have various wheel arrangements and may include an on-board electric motor that can be used for propulsion of the cycle.

SUMMARY OF ILLUSTRATIVE VARIATIONS

A number of illustrative variations may involve a product that may include a battery pack. A housing may receive the battery pack. The housing may comprise a plastic that has a first thermal conductivity. The housing may contain an additive that is electrically insulating and that has a second thermal conductivity that is greater than the first thermal conductivity.

A number of additional illustrative variations may involve a product that may include a battery pack that may contain at least one battery cell. A housing may receive the battery pack and may include a heat-conductive constituent and a thermoplastic resin. The housing may be constructed and arranged to conduct heat and to insulate against the conduction of electricity.

A number of other illustrative variations may involve a method that may include providing a number of battery cells. A housing may be formed from a material that may comprise a thermoplastic resin and a ceramic. The battery cells may be assembled into the housing. A support structure may be provided and may be mechanically and thermally coupled to the housing.

Other illustrative variations within the scope of the invention will become apparent from the detailed description provided herein. It should be understood that the detailed description and specific examples, while disclosing variations within the scope of the invention, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein:

FIG. 3 illustrates a battery pack, which may be the battery pack of FIG. 2, and shown partially inserted into a housing in perspective view according to a number of variations.

FIG. 4 is a schematic, fragmentary, cross sectional illustration of part of the battery pack and housing of FIG. 3.

FIG. 5 illustrates part of an electric cycle in fragmentary perspective view according to a number of variations.

DETAILED DESCRIPTION OF ILLUSTRATIVE VARIATIONS

The following description of the variations is merely illustrative in nature and is in no way intended to limit the scope of the invention, its application, or uses.

Figure 1:
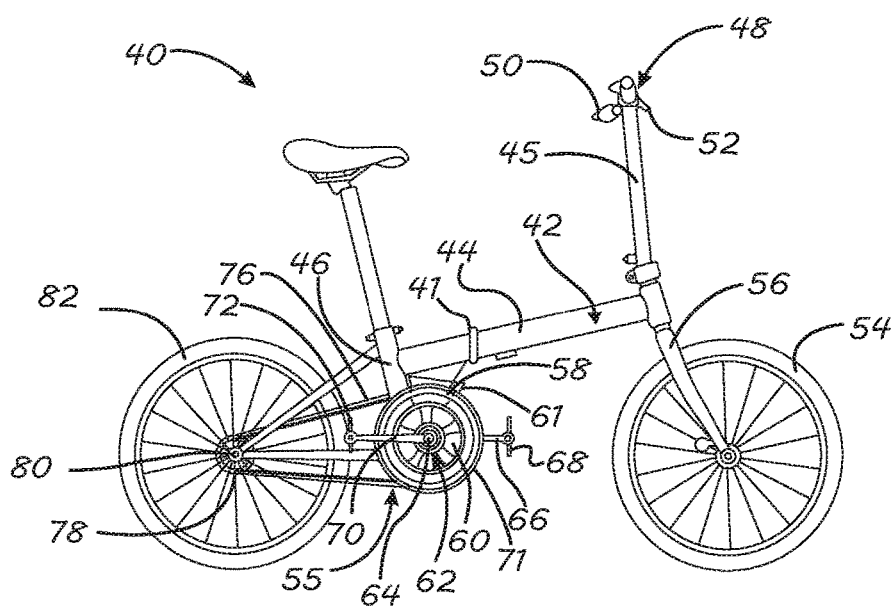
FIG. 1 illustrates an electric cycle according to a number of variations.

FIG. 1 illustrates a number of variations which may include an electric cycle 40. In any of a number of variations, the electric cycle 40 may include a frame 42 which may include a main tube 44 connected to a seat tube 46. The main tube 44 may include a hinged joint 41 to enable folding the frame 42, so that the electric cycle 40 may be more easily transported and stored. A steering tube 45 may extend from the main tube 44. The steering tube 45 may be operatively connected to a front fork 56 which may be attached to a front wheel 54. Handlebars 48 may be attached to the steering tube 45 and may be used to control the direction of the front wheel 54 by way of the front fork 56. Control levers 50 may be provided on the handlebars 48 and may be constructed and arranged to communicate with one or more input or control devices, and/or a motor. The one or more electronic control devices may include electronic processing components to receive input signals and to send out signals to control various components of the electric cycle 40, which may include sending output signals to control operation of an electric motor that may be associated with a power unit 60. In a number of variations the one or more electronic control devices may include memory, a processor and software and/or hardware to process input signals and generate output signals, and may include formulas, lookup tables or other means for comparing and processing data. The one or more electronic control devices may be associated with a circuit board 124 (shown in FIG. 2), and may be provided in a housing 150 (shown in FIG. 3), along with a battery pack 122 (also shown in FIG. 2), and may include power electronics including an inverter that changes direct current from the battery to alternating current.

The electric cycle 40 may also include a propulsion system 55 that may include the power unit 60. The propulsion system 55 may also include a crank assembly 62 which may include a crankshaft 64 that may be connected with a first pedal assembly 66 and a second pedal assembly 70. The first pedal assembly 66 may include a first foot pedal 68, and the second pedal assembly 70 may include a second foot pedal 72. A linked element 71, which may be a sprocket or a pulley or another device for linking with the drive wheel 82, may be operatively connected to the crankshaft 64 for driving a linking member 76. The linking member 76 may be a chain or belt or another link suitable for engaging the linked element 71 and may be operatively connected to a rear linked element 78 which may be operatively connected to a hub 80 of the drive wheel 82. The drive wheel 82 may be a road wheel in-that it contacts the surface upon which the cycle 40 operates. The linked element 78 may be a sprocket or pulley or another device suitable for engaging with the linking member 76.

The electric cycle 40 may be constructed and arranged to allow a rider to rotate a first and second pedal assembly 66, 70 to power the electric cycle 40. A rider may use a pedal force-based propulsion system with the first and second pedal assemblies 66, 70 so that a rider may provide input commands by applying a force to a first foot pedal 68 attached to the first pedal assembly 66 or a second foot pedal 72 attached to the second pedal assembly 70 in the clockwise or counter clockwise direction to command propulsion of the electric cycle 40. The electric cycle 40 may be a bicycle, tricycle, or four-wheel electric cycle having the crank assembly 62 constructed and arranged to allow a rider to provide input thereto using the first pedal assembly 66 and the second pedal assembly 70.

Figure 2:
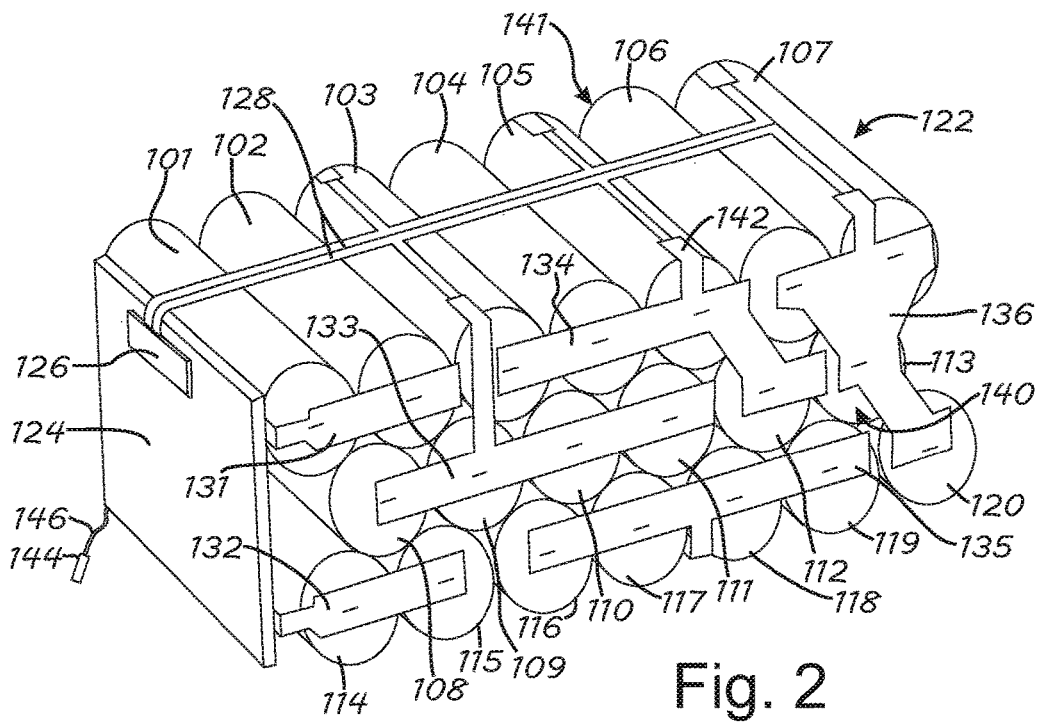
FIG. 2 illustrates a battery pack in perspective view according to a number of variations.

The power unit 60 may include an electric motor-generator that may be powered by a battery or any number of batteries or battery assemblies, which, with reference to FIG. 2, may include battery cells 101-120 that may each be part of battery set referred to as battery pack 122. The battery pack 122 may be disposed in a rectangular stack, or another arrangement to fit the space limitations and power requirements of the application. The battery pack 122 may be arranged in multiple rows of cells that may be offset from one another so that the cylindrical shaped cells may be packed closer together. The circuit board 124 may be positioned adjacent the battery pack 122 and may support a variety of control operations such as battery state monitoring, temperature, and/or sensor functions, and may provide conductors for interconnecting various elements. The circuit board 124 may include a terminal block 126 for interconnection with conductors, such as electrical conductor set 128. Each of the battery cells 101-120, may have terminals, which may be on each of its ends, and that may be interconnected with bus bars, such as bus bars 131-136 on the side 140 of the battery pack 122. Bus bars may also be provided on the side 141 of the battery pack 122. The bus bars 131-136 may connect groups of cells, for example, bus bar 134 may connect terminals of cells 103, 104, 105 and 112, at their ends on the side 140. The bus bars 131-136 may be connected with the terminal block 126 through the electrical conductor set 128. The bus bars 131-136 may include tabs, such as the tab 142 of bus bar 134, which may be connected with the electrical conductor set 128, which may be connected with the terminal block 126. The battery pack 122 may include one or more connectors 144 connected with the cells 101-120 through a conductor 146 for supplying power to the power unit 60 and for charging the battery pack 122 from the power unit 60, or from an external electric source.

Referring to FIG. 3, the battery pack 122 may be inserted into a housing 150. As indicated by the arrows in FIG. 3, the battery pack 122 is shown in the process of being inserted into the housing 150, and as viewed is disposed part way into the housing 150. It will be understood that the battery pack 122 will be completely inserted into the housing 150 and contained therein. The housing 150 may be provided in a shape that fits closely over the battery pack 122. The housing 150 may include four sides 151-154. The sides 151 and 153 may fit close to the battery pack 122 and may contact the bus bars on each side 140, 141 of the battery pack 122. For example, the bus bars 133-135 are shown contacting the side 151. The housing 150 may be made from a variety of materials that may exhibit heat conductive properties and that may be electrically insulating. For example, the housing 150 may be made of a thermoplastic resin material modified to improve its thermal conductivity properties. The selected material may be formed into the desired shape through known processes, to provide the housing 150. The material may be selected to have a melting point above the operating temperatures of the battery pack 122, such as above 100 degree Celsius. The material may be selected from a medium temperature plastic such as acrylonitrile butadiene styrene, poly butylene terephthalate, polycarbonate, or an aliphatic or semi-aromatic polyamide, or another material. In higher temperature applications, the material may be selected from those such as liquid crystal polymer, polyphenylene sulfide, polyether ether ketone, polysulfone, or another material. In lower temperature applications the housing 150 may be made of a material such as polypropylene or polystyrene. The selected material may be modified by adding a thermal conductivity improving substance such as a ceramic, which may be aluminum nitride, boron nitride, or another heat conducting and electrically insulating material. The bus bars 131-135 may contact the housing 150 to provide a heat conduction route there-between to remove heat generated or conducted by the bus bars by transferring it to the housing 150, which may radiate to the atmosphere. The battery cells 101-120 may contact the housing 150 to provide a heat conduction route therebetween. For example, the battery cells 101-107 may contact the side 152 of the housing 150. Also, for example, the ends of the cells 101-120 may contact the sides 151, 153 of the housing 150. The housing 150 may include external ribs, which may be shaped as cooling fins 156 to assist in convective heat transfer away from the housing 150 to the adjacent air. With reference to FIG. 4, an exemplary battery cell 102 of the battery pack 122 may be in electrical communication with the bus bar 131 through a contact 157. As shown, the housing 150 may contact the bus bar 131. Also as shown, the housing 150 may contact the side 159 of the battery cell 102. In addition, the housing 150 may contact the end 161 of the battery cell 102, and may include a slot 163 that may receive the bus bar 131. Contact may similarly be provided from other of the battery cells 101, 103-120 and the housing 120, and between the other bus bars 132-135 and the housing 120, for heat transfer purposes. The cooling fins 156 may be provided on the exterior of the housing 150, but may be omitted at interfaces with the electric cycle 40, such as at surface 167 which may contact the electric cycle 40 at its frame 42 or an attached bracket to maximize contact area for heat transfer from the housing 150 to the cycle 40.

In a number of variations as illustrated in FIG. 5, the electric cycle 40 may include a bracket 160 fixed to the main tube 44 and/or the seat tube 46, or to another part of the frame 42, and may include a contoured portion 162 matching the exterior of the power unit 60. The bracket 162 may serve as a support and coupling structure between the housing 150 and the electric cycle 40 as a vehicle. The bracket mat serve as a heat transfer route from the housing 150 to the frame 42. The bracket 160 may hold the power unit 60 relative to the frame 42. The crank assembly 62 (not shown in FIG. 5), may connect at the opening 164. The battery pack 122 in the housing 150 may be mounted above the power unit 60. The connector 144 may be connected to a mating connector (not shown), of the power unit 60. The housing 150 may be mounted to contact the bracket 160 and/or the frame 42 to provide heat conducting paths therebetween. The cooling fins 156 may be omitted or flattened at select locations, such as shown in FIG. 4, to maximize the surface area of the contact interfaces between the housing 150 and the bracket 160 and/or frame 42, such as at interface 165. The frame 42 may act as a heat sink for the battery pack 122. With the advantageous cooling hereof, the housing 150 may be closed by an end wall 168 to provide a weather tight and/or air-tight and sealed construction encapsulating the battery pack 122. The housing 150 may be completely closed around the battery pack 122 so that it may be hermetically sealed meaning the entry of unwanted dust, water or other debris is blocked.

Through the variations described above, the range of an electric cycle 40 may be extended by unique cooling mechanisms providing reduced operating temperatures of the battery pack 122. With the passive cooling provided, the number of cells required in the battery pack 122 may optionally be reduced to achieve a desired range. The following description of variants is only illustrative of components, elements, acts, products and methods considered to be within the scope of the invention and are not in any way intended to limit such scope by what is specifically disclosed or not expressly set forth. The components, elements, acts, products and methods as described herein may be combined and rearranged other than as expressly described herein and still are considered to be within the scope of the invention.

Variation 1 may involve a product that may include a battery pack, and a housing may receive the battery pack. The housing may comprise a plastic that has a first thermal conductivity. The housing may contain an additive that is electrically insulating and that has a greater thermal conductivity than the plastic.

Variation 2 may include the product according to variation 1 wherein the housing may be airtight.

Variation 3 may include the product according to variation 1 wherein the battery pack may include a number of battery cells that may be interconnected by at least one bus bar. The bus bar may contact the housing.

Variation 4 may include the product according to variation 3 wherein each of the number of the battery cells may contact the housing.

Variation 5 may include the product according to variation 1 wherein the plastic may comprise a structure containing a thermoplastic resin with a ceramic intermixed in the thermoplastic resin.

Variation 6 may include the product according to variation 1 and may include an electric cycle with a frame. The housing may be mounted to the frame and may contact the frame.

Variation 7 may include the product according to variation 1 wherein the housing may include an external surface with cooling fins.

Variation 8 may involve a product that may include a battery pack that may contain at least one battery cell. A housing may receive the battery pack and may include a heat-conductive constituent and a thermoplastic resin. The housing may be constructed and arranged to conduct heat and to insulate against the conduction of electricity.

Variation 9 may include the product according to variation 8 wherein the housing may be hermetically sealed.

Variation 10 may include the product according to variation 8 wherein the battery pack may include a number of battery cells that may be interconnected by at least one bus bar. The bus bar may contact the housing.

Variation 11 may include the product according to variation 10 wherein each of the number of the battery cells may contact the housing.

Variation 12 may include the product according to variation 8 wherein the thermoplastic resin may have a melting point temperature above 100 degrees Celsius.

Variation 13 may include the product according to variation 8 and may include an electric cycle with a frame. The housing may be mounted to the frame and may contact the frame.

Variation 14 may include the product according to variation 13 wherein the housing may include an external surface that may have cooling fins. The housing may contact the frame at an interface, and wherein there may be no cooling fins at the interface.

Variation 15 may involve a method that may include providing a number of battery cells. A housing may be formed from a material that may comprise a thermoplastic resin and a ceramic. The battery cells may be assembled into the housing. A support structure may be provided and may be mechanically and thermally coupled to the housing.

Variation 16 may include the method according to variation 15 and may include providing the housing with an external surface. Cooling fins may be formed on the external surface.

Variation 17 may include the method according to variation 15 and may include selecting the thermoplastic resin from a group consisting of acrylonitrile butadiene styrene, poly butylene terephthalate, polycarbonate, or an aliphatic or semi-aromatic polyamide.

Variation 18 may include the method according to variation 15 and may include connecting at least some of the number of battery cells with a bus bar so that a contacting interface may be established between the housing with the bus bar.

Variation 19 may include the method according to variation 18 and may include providing the housing as an air-tight structure around the number of battery cells.

Variation 20 may include the method according to variation 15 and may include providing an electric cycle with a frame and forming the support structure as a bracket on the frame.

The above description of select variations within the scope of the invention is merely illustrative in nature and, thus, variations or variants thereof are not to be regarded as a departure from the spirit and scope of the invention.

What is claimed is:

1. A product comprising a battery pack, and a housing receiving the battery pack, wherein the housing comprises a plastic that has a first thermal conductivity and comprises an additive that is electrically insulating and that has a second thermal conductivity that is greater than the first thermal conductivity, wherein the housing is airtight and wherein the battery pack includes a number of battery cells, wherein the battery cells are all interconnected by at least one bus bar and wherein the at least one bus bar is flat and substantially all of the at least one bus bar contacts the housing.

2. The product according to claim 1 comprising a frame to which the housing is mounted and cooling fins on the housing, wherein the cooling fins are omitted at interfaces with the frame to maximize contact area for heat transfer from the housing to the frame.

3. The product according to claim 1 wherein each of the number of the battery cells contacts the housing, wherein the at least one bus bar comprises plural bus bars and wherein the housing includes two sides that fit close to the battery pack, wherein the two sides include slots within which the bus bars contact the housing.

4. The product according to claim 1 wherein the plastic comprises a structure containing a thermoplastic resin with a ceramic intermixed in the thermoplastic resin as the additive.

5. The product according to claim 1 further comprising an electric cycle with a frame, wherein the housing is mounted to the frame and wherein the housing contacts the frame.

6. The product according to claim 1 wherein the housing includes an external surface with cooling fins.

7. A product comprising a battery pack containing multiple rows of battery cells, a housing receiving the battery pack and comprising a heat-conductive constituent and a thermoplastic resin, wherein the housing is constructed and arranged to conduct heat and to insulate against the conduction of electricity, wherein the battery cells are all interconnected by at least on bus bar and wherein the at least one bus bar is flat and substantially all of the at least one bus bar contacts the housing, and wherein the housing is hermetically sealed.

8. The product according to claim 7 wherein the at least one bus bar comprises plural bus bars and wherein the housing includes two sides that fit close to the battery pack, wherein the two sides include slots within which the bus bars contact the housing.

9. The product according to claim 8 wherein each of the battery cells contacts the housing.

10. The product according to claim 7 wherein the thermoplastic resin has a melting point temperature above 100 degrees Celsius.

11. The product according to claim 7 further comprising an electric cycle with a frame, wherein the housing is mounted to the frame and wherein the housing contacts the frame.

12. The product according to claim 11 wherein the housing includes an external surface with cooling fins, and wherein the housing contacts the frame at an interface, and wherein there are no cooling fins at the interface.

13. A method comprising:
providing a number of battery cells;
forming a housing from a material comprising a thermoplastic resin and a ceramic;
assembling the battery cells into the housing;
providing a support structure;
mounting a bracket to the support structure;
mounting a power unit to the bracket;
powering the power unit with the battery cells;
mounting the battery cells on the bracket and above the power unit;
mechanically and thermally coupling the housing to the support structure through the bracket;
providing the housing as an air-tight structure around the number of battery cells; and
connecting at least some of the number of battery cells with a bus bar, wherein the bus bar is flat, and establishing a contacting interface between the housing with the bus bar such that substantially all of the at least one bus bar contacts the housing.

14. The method according to claim 13 comprising providing the housing with an external surface and forming cooling fins on the external surface, and omitting at interfaces with the support structure to maximize contact area for heat transfer from the housing to the support structure.

15. The method according to claim 13 comprising selecting the thermoplastic resin from a group consisting of acrylonitrile butadiene styrene, poly butylene terephthalate, polycarbonate, or an aliphatic or semi-aromatic polyamide.

16. The method according to claim 13 comprising providing an electric cycle with a frame and forming the support structure as a bracket on the frame.

* * * * *